US011897250B2

(12) United States Patent
Leonardi et al.

(10) Patent No.: US 11,897,250 B2
(45) Date of Patent: Feb. 13, 2024

(54) MACHINE FOR DRYING INKS OF THE UV TYPE

(71) Applicant: PHOTO ELECTRONICS S.R.L., Povegliano Veronese (IT)

(72) Inventors: Fabio Leonardi, Trevenzuolo (IT); Adriano Zanardo, Villafranca di Verona (IT)

(73) Assignee: PHOTO ELECTRONICS S.R.L., Povegliano Veronese (IT)

( * ) Notice: Subject to any disclaimer, the term of this patent is extended or adjusted under 35 U.S.C. 154(b) by 0 days.

(21) Appl. No.: 17/769,111

(22) PCT Filed: Oct. 14, 2020

(86) PCT No.: PCT/IB2020/059642

§ 371 (c)(1),
(2) Date: Apr. 14, 2022

(87) PCT Pub. No.: WO2021/074809

PCT Pub. Date: Apr. 22, 2021

(65) Prior Publication Data

US 2023/0138399 A1 May 4, 2023

(30) Foreign Application Priority Data

Oct. 16, 2019 (IT) ........................ 102019000018977

(51) Int. Cl.
*B41F 23/04* (2006.01)
*B41J 3/407* (2006.01)
*B41J 11/00* (2006.01)

(52) U.S. Cl.
CPC ....... *B41F 23/0409* (2013.01); *B41J 3/40731* (2020.08); *B41J 11/00214* (2021.01); *B41J 11/00218* (2021.01)

(58) Field of Classification Search
CPC ............... B41F 23/0409; B41J 3/40731; B41J 11/00218; B41J 11/00214
See application file for complete search history.

(56) References Cited

U.S. PATENT DOCUMENTS 5,031,748 A * 7/1991 Bianchini ............. B65B 7/2807
198/380
7,498,065 B2 * 3/2009 Siegel .................. B41M 7/0081
427/457

(Continued)

FOREIGN PATENT DOCUMENTS

EP 2857210 A1 4/2015
ES 2565692 A1 4/2016

OTHER PUBLICATIONS

International Search Report dated Jan. 27, 2021 re: Application No. PCT/IB2020/059642, pp. 1-4, citing: ES 2 665 692 A1, US 2006/0221780 A1, U.S. Pat. No. 7,498,065 B2, US 2005/042390 A1 and EP 2 857 210 A1.

(Continued)

*Primary Examiner* — David H Banh
(74) *Attorney, Agent, or Firm* — CANTOR COLBURN LLP

(57) ABSTRACT

A machine for drying inks of the UV type, the machine including a supporting frame, which forms at least one exposure chamber, which can be accessed from the outside and accommodates at least one UV ray emission source. On the supporting frame, there is at least one carriage which supports rotatably at least one pan for supporting at least one object to be processed which is provided, on its surface, with at least one print provided by UV inks. Elements are furthermore provided for the rotational actuation of the pan; the carriage is movable in order to move the pan from an exposure position to at least one respective access position, (Continued)

in which the pan is arranged outside of the exposure chamber, in order to allow the loading or unloading of the object on or from the pan.

15 Claims, 12 Drawing Sheets

(56) References Cited

U.S. PATENT DOCUMENTS

| | | | | |
|---|---|---|---|---|
| 2003/0067499 | A1* | 4/2003 | Shimizu | B41J 3/4071 347/2 |
| 2004/0011457 | A1* | 1/2004 | Kobayashi | B29C 66/954 156/379.6 |
| 2004/0166249 | A1* | 8/2004 | Siegel | B41J 11/00212 347/102 |
| 2005/0042390 | A1* | 2/2005 | Siegel | F26B 3/28 118/52 |
| 2006/0221780 | A1* | 10/2006 | Sugahara | G11B 19/28 369/30.01 |
| 2007/0072523 | A1* | 3/2007 | Miyahara | G11B 7/26 |
| 2007/0146458 | A1* | 6/2007 | Perego | B41J 11/00218 347/102 |
| 2014/0003899 | A1* | 1/2014 | Okamoto | G11B 23/0323 414/618 |
| 2016/0368088 | A1* | 12/2016 | Kudo | B23K 26/082 |

OTHER PUBLICATIONS

IT Search Report dated Jun. 10, 2020, re: Application No. IT 201900018977, pp. 1-8, citing: ES 2 565 692 A1, US 2006/0221780 A1, US 2005/042390 A1 EP 2 857 210 A1 and U.S. Pat. No. 7,498,065 B2.

Written Opinion dated Jan. 27, 2021 re: Application No. PCT/IB2020/059642, pp. 1-6, citing: ES 2 565 692 A1, US 2006/0221780 A1, and US 2005/042390 A1.

* cited by examiner

MACHINE FOR DRYING INKS OF THE UV TYPE

TECHNICAL FIELD

The present disclosure relates to a machine for drying inks of the UV type.

BACKGROUND

As is known, in the industrial printing sector, particularly in the sector of the screen printing of containers, printing machines, commonly called "semiautomatic" machines, are currently used and marketed which are generally not provided with devices for drying the inks.

These machines are very widespread and are used since they provide fast and economical change of format, allowing to work on small samples or runs.

However, the lack of devices that allow to dry the inks immediately forces to use such machines only with inks of the solvent-based type, with consequent long times of execution of the related production processes and a printing quality that is not always satisfactory.

In fact, the production processes in which solvent-based inks are used require that after printing the operator stores the printed object in a storage area where the ink is left to dry in contact with the air for a time that can last up to 24 hours.

In other cases, the operator stores the printed objects in a carriage that is subsequently placed in a hot air oven, where the drying of the inks is obtained in few hours.

In an attempt to obviate these problems, solutions have been also proposed which entail the use of inks of the UV type which are dried by means of traditional UV lamps, particularly quartz and mercury or mercury and halide UV lamps, applied on the printing machines or arranged in their immediate vicinity.

The use of these lamps, however, affects negatively the overall dimensions of the machines and their convenience in use, since it entails the need to provide bulking housings to protect the operators from UV rays.

Furthermore, these lamps produce a large amount of heat and therefore need extraction systems to extract the heat and the ozone generated by them.

SUMMARY

The aim of the present disclosure is to provide a machine for drying inks of the UV type that is capable of improving the background art in one or more of the above mentioned aspects.

Within this aim, the disclosure provides a machine for drying inks of the UV type that is compact, so that it can be placed to the side of the printing machine, in order to allow the operator to use both machines from a single station.

The disclosure also provides a machine for drying inks of the UV type that is versatile, so as to not require further accessories for changing format, and can be of high productivity in order to be able to work at the current working rates of printing machines.

The disclosure further provides a machine for drying inks of the UV type that can dry the UV inks with reduced consumption and with a reduced environmental impact.

The disclosure provides a machine for drying inks of the UV type that is capable of ensuring maximum protection to the operators against UV rays.

Furthermore, the present disclosure overcomes the drawbacks of the background art in a manner that is alternative to any existing solutions.

The disclosure also provides a machine for drying inks of the UV type which, besides being capable of offering the greatest assurances of reliability and safety in operation and in use, can also be relatively easy to provide so as to be competitive also from a purely economic standpoint.

This aim and these and other advantages which will become better apparent hereinafter are achieved by providing a machine for drying inks of the UV type according to claim 1, optionally provided with one or more of the characteristics of the dependent claims.

BRIEF DESCRIPTION OF THE DRAWINGS

Further characteristics and advantages of the disclosure will become better apparent from the description of a preferred but not exclusive embodiment of the machine according to the disclosure, illustrated by way of non-limiting example in the accompanying drawings, wherein.

DETAILED DESCRIPTION OF THE DRAWINGS

Figure 1:
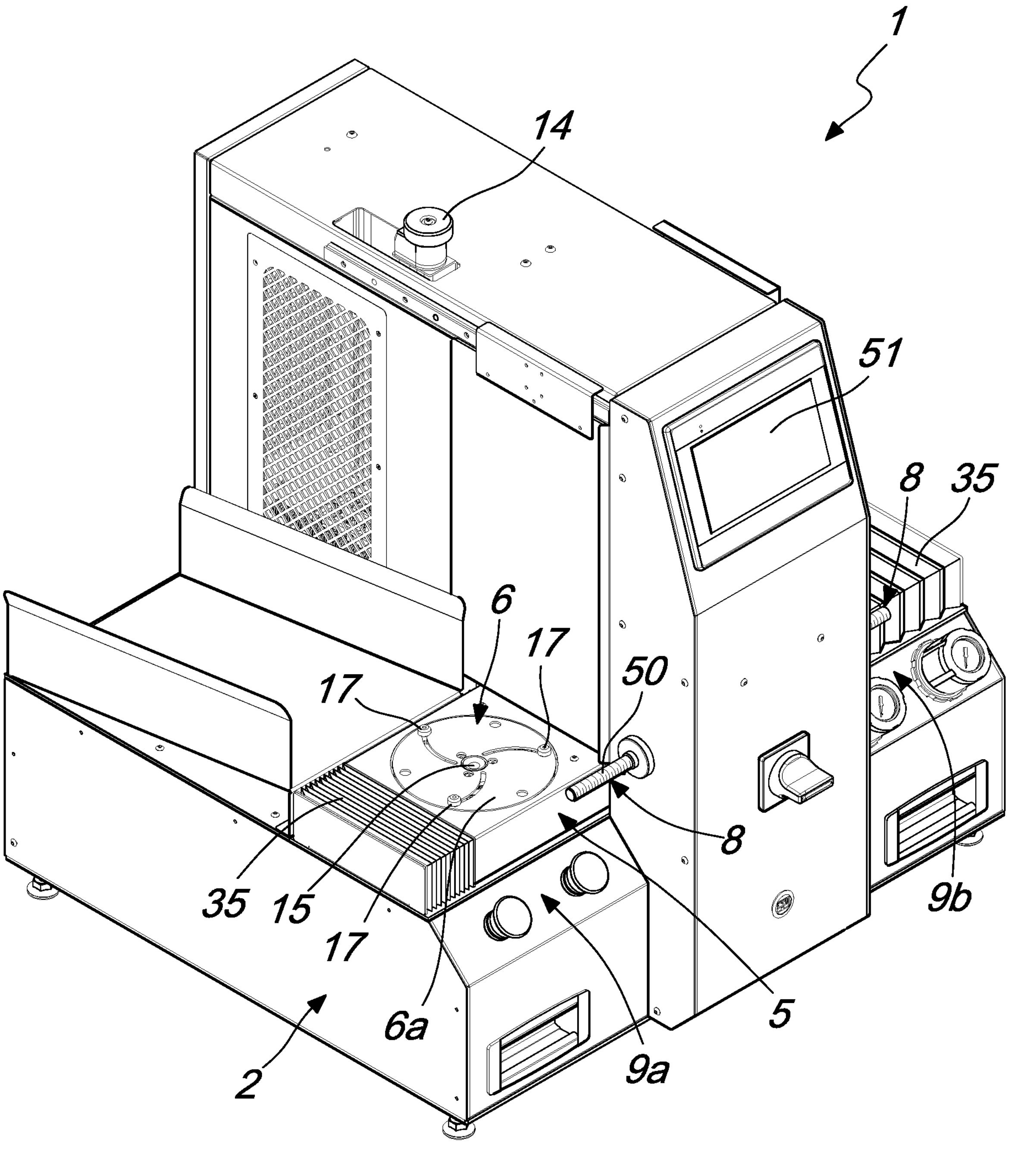
FIG. 1 is a perspective view of the machine according to the disclosure.
Figure 2:
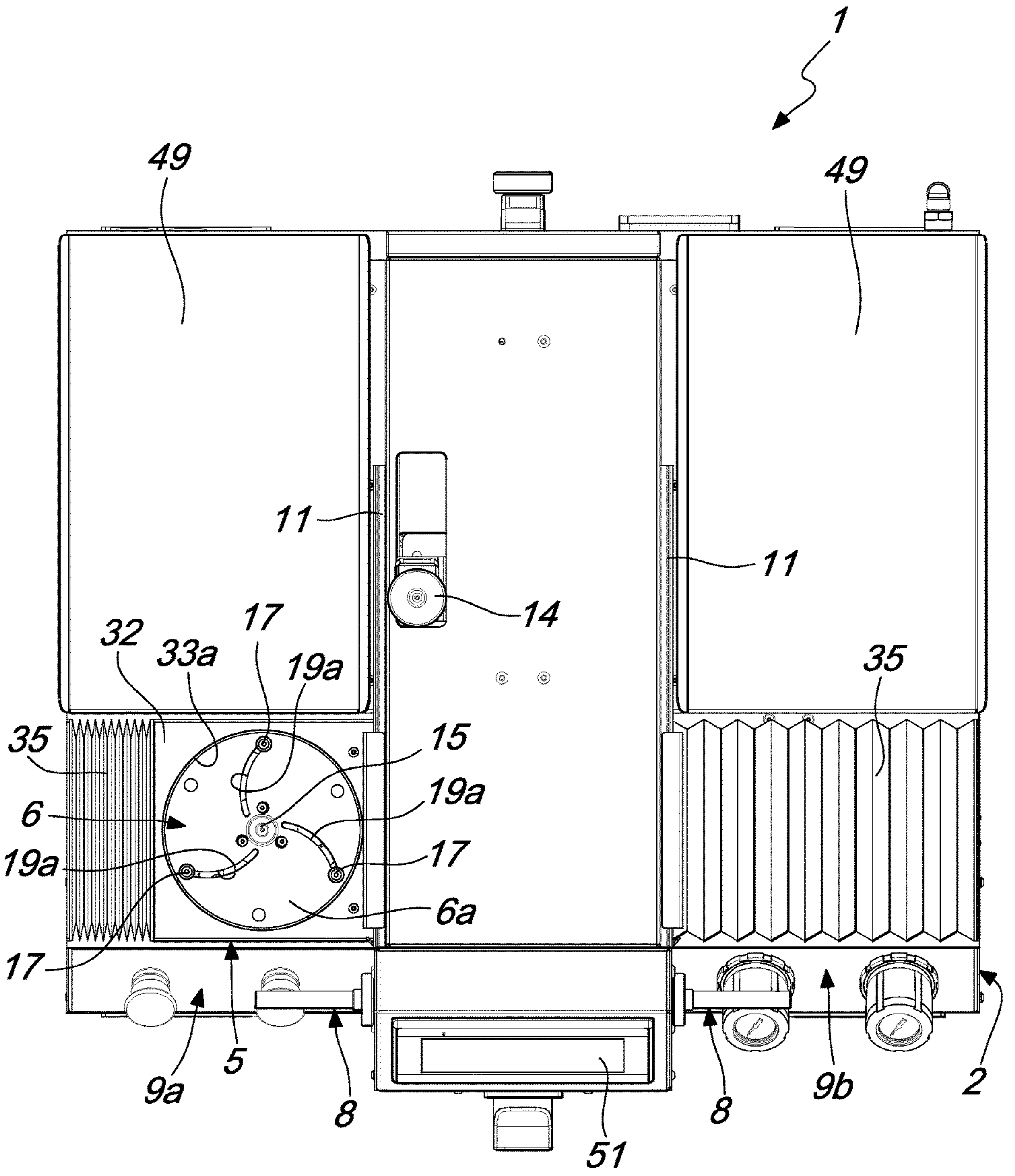
FIG. 2 is a top plan view of the machine according to the disclosure.
Figure 3:
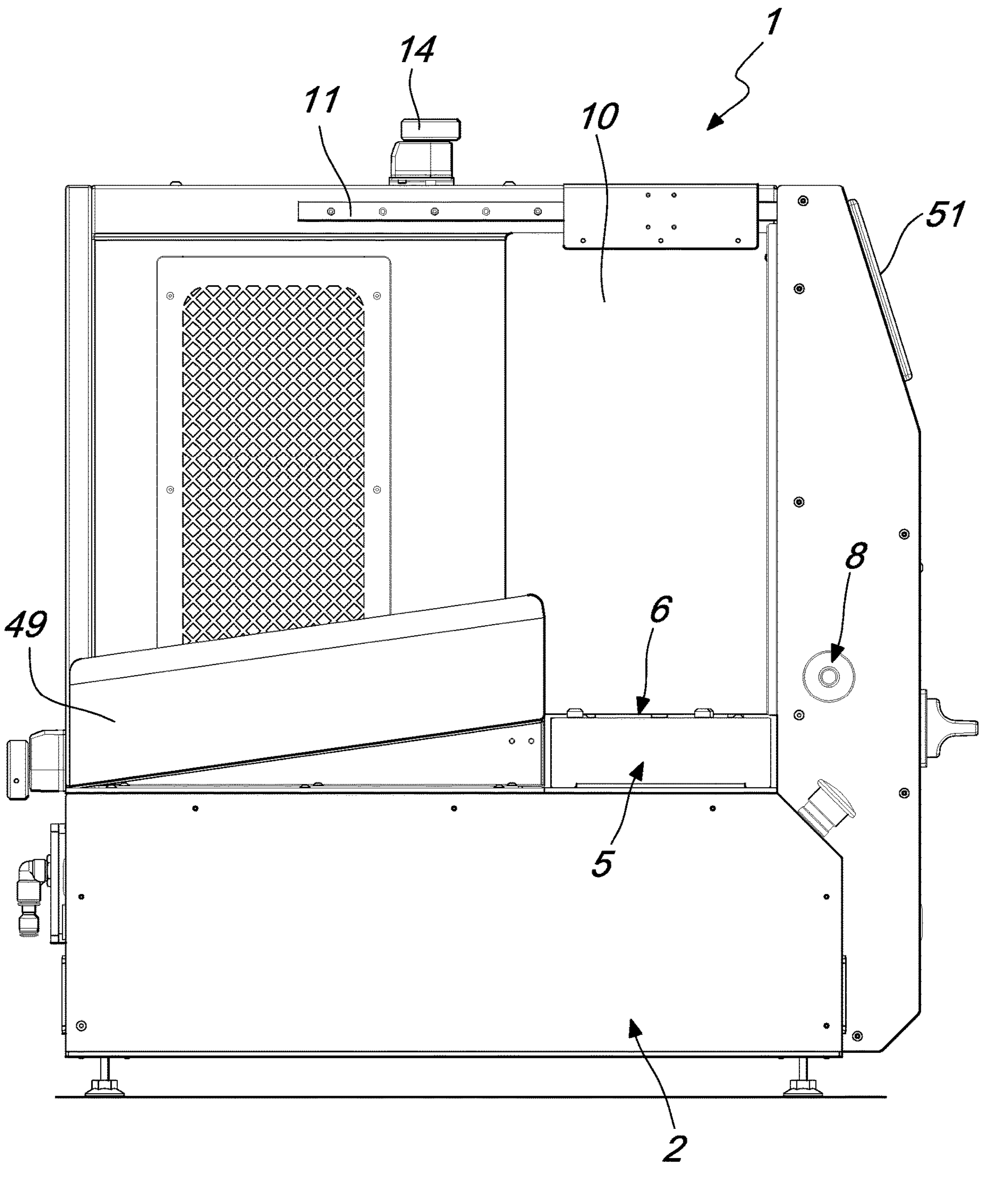
FIG. 3 is a lateral elevation view of the machine according to the disclosure.
Figure 4:
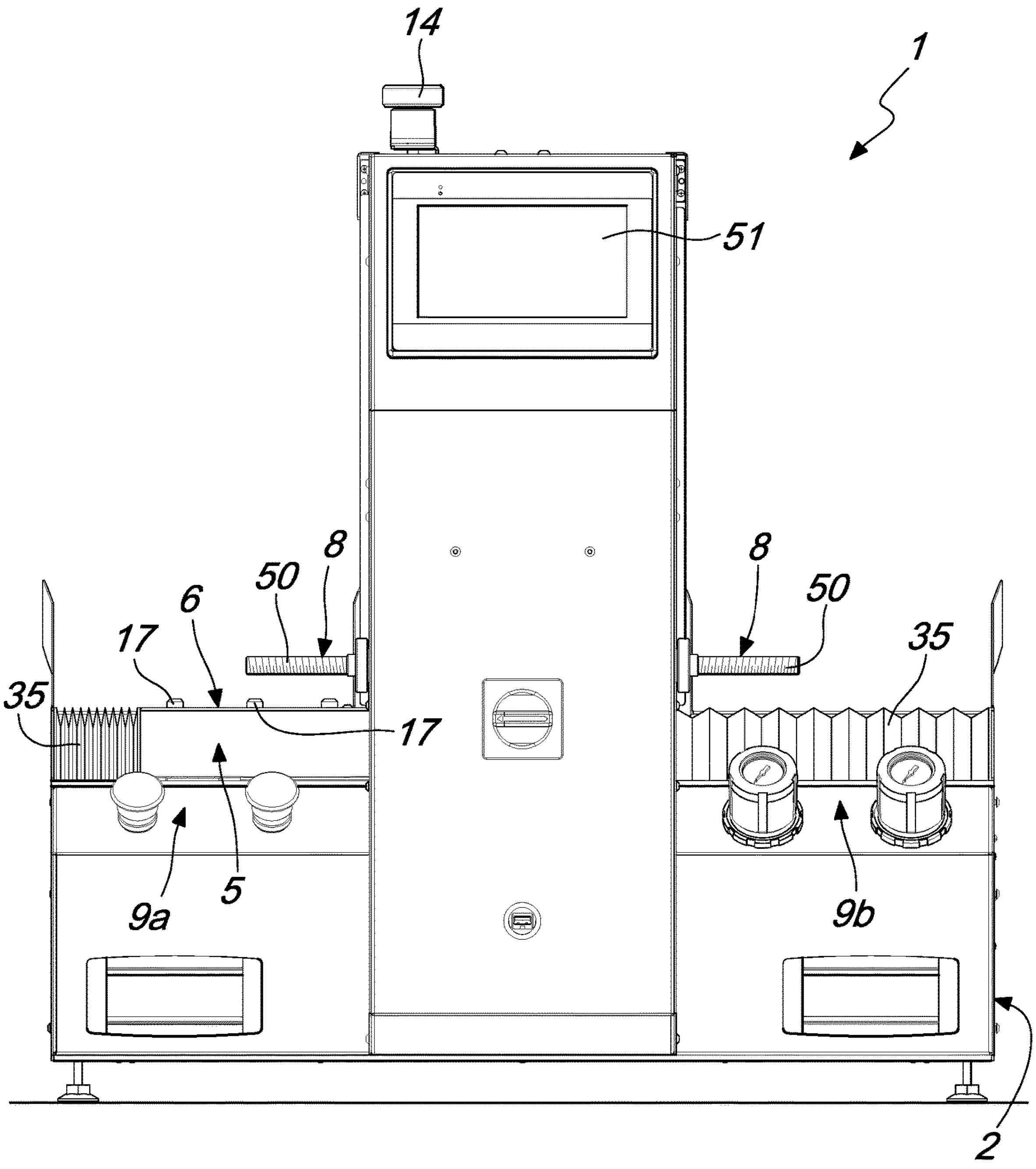
FIG. 4 is a front elevation view of the machine according to the disclosure.
Figure 5:
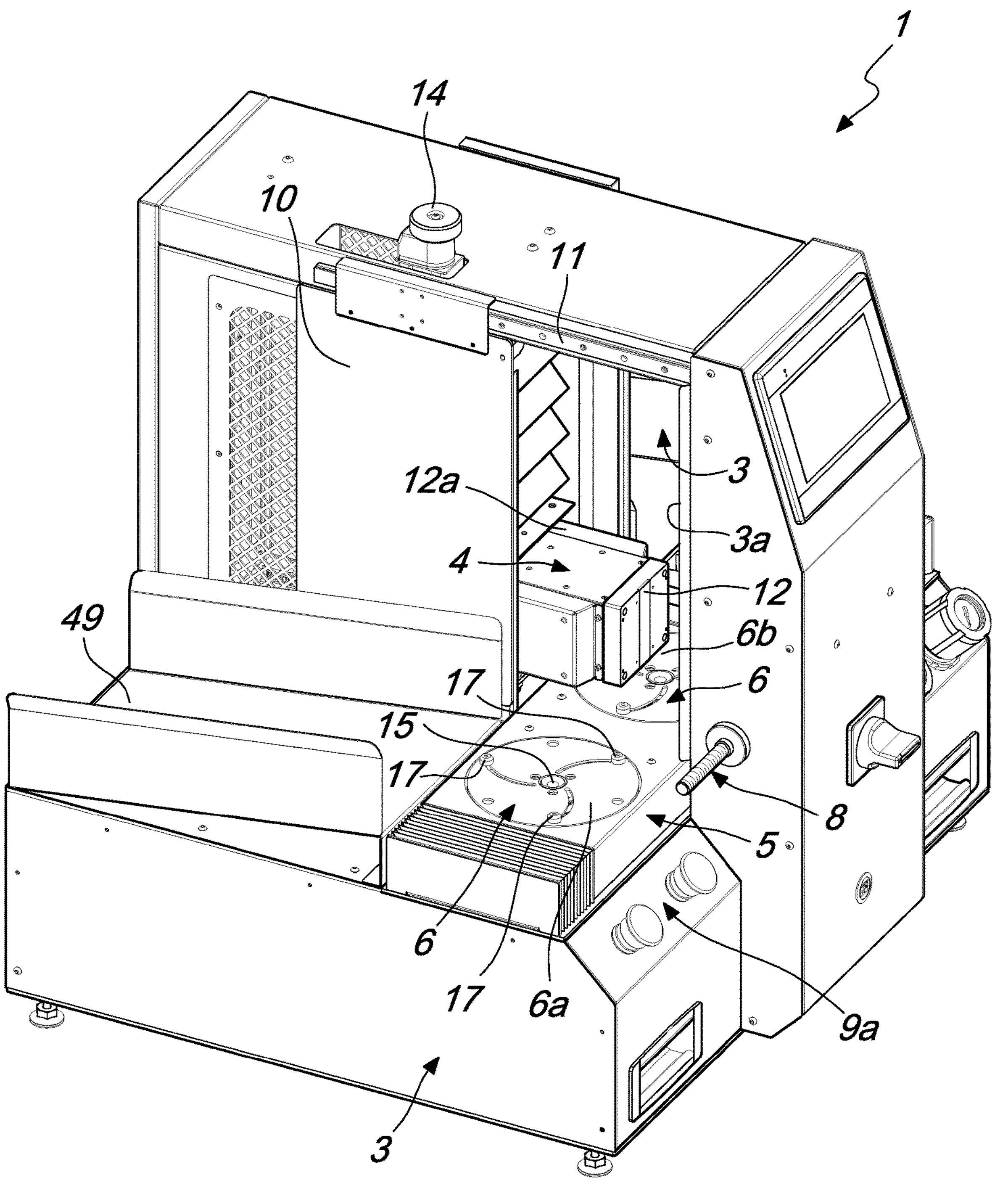
FIG. 5 is a perspective view of the machine according to the disclosure with the closing doors of an exposure chamber in the open condition.

With reference to the figures, the machine for drying inks of the UV type, according to the disclosure, generally designated by the reference numeral 1, comprises a supporting frame 2, which forms at least one exposure chamber 3, which can be accessed from the outside and accommodates inside at least one UV ray emission source 4.

According to the disclosure, at least one carriage 5 is mounted on the supporting frame 2 and supports rotatably at least one supporting pan 6 for at least one object to be processed, such as for example a container or other type of object, which is provided, on its surface, with at least one print provided by means of UV inks, previously applied to the object to be processed, for example by a semiautomatic printing machine positioned conveniently in the vicinity of said machine according to the disclosure.

Again, according to the disclosure, there are means 7 for the rotational actuation of the pan 6 about its own axis in order to allow to rotate the object to be processed loaded on the pan 6.

In particular, the carriage 5 can move with respect to the supporting frame 2 so as to be able to move the pan 6 from an exposure position, in which the pan 6 is arranged inside the exposure chamber 3, in order to allow the execution of at least one step or cycle of drying of the UV inks by means of the exposure of the UV inks applied to the surface of the object to be processed arranged on the pan 6 to the UV rays emitted by the emission source 4, to at least one respective access position, in which the pan 6 is arranged outside the exposure chamber 3, in order to allow the loading of the object to be processed on the pan 6 or the unloading of the processed object, after its exposure to UV rays in the exposure chamber 3, from said pan.

For example, in the access position of the pan 6 manual access to the pan 6 by a human operator is allowed, and said operator can thus manually provide, in each instance, for the loading on the pan 6 of an object to be processed on which said operator has previously applied printing with UV inks by means of an adjacent semiautomatic printing machine, so as to dry the UV inks following the subsequent movement of the carriage 5 with consequent movement of the pan 6 and of the object to be processed thereon in the exposure position.

More particularly, the rotational actuation means 7 of the pan 6 can be activated on command, at least when the pan 6 is in the exposure position.

Advantageously, the pan 6 comprises means for the centering and locking of the object to be processed with respect to the pan 6, better described hereinafter, which allow the centering with respect to the axis of the pan 6 of any type of object to be processed, ensuring, at the same time, its appropriate retention in position in order to avoid its tipping during the drying cycle.

Conveniently, in order to allow high performances and a high production rate, it is possible moreover to provide means 8 for the automatic unloading of the processed object from the pan 6, which can be activated on command when the pan 6 is in the access position, in order to allow the unloading of the processed object from the pan 6 without the need for a manual intervention by the human operator.

According to the preferred embodiment of the machine according to the disclosure, shown in the figures, the carriage 5 supports rotatably at least two supporting pans 6, respectively at least one first pan 6*a* and at least one second pan 6*b*, each designed to support at least one respective object to be processed.

In this case, the carriage 5 is movable with respect to the supporting frame 2, so that alternately one of the pans 6*a*, 6*b* is in the exposure position and simultaneously the other pan 6*a*, 6*b* is in the access position.

More particularly, the carriage 5 can, advantageously, move by translation, with an alternating back and forth motion, along a movement trajectory, between at least two stroke limit positions, respectively a first stroke limit position 9*a* and a second stroke limit position 9*b*, arranged at the opposite ends of the movement trajectory of the carriage 5.

Again with reference to the illustrated embodiment, the exposure chamber 3 is formed advantageously in an intermediate region along the movement trajectory, between the first and second stroke limit positions 9*a* and 9*b* of the carriage 5.

Conveniently, the pans 6*a* and 6*b* are arranged so as to be mutually aligned along a direction that is substantially parallel to the movement trajectory of the carriage 5.

In particular, when the carriage 5 is in the first stroke limit position 9*a* the first pan 6*a* is in the corresponding access position and the second pan 6*b* is in the exposure position, while when the carriage 5 is in the second stroke limit position 9*b* the first pan 6*a* is in the exposure position and the second pan 6*b* is in the corresponding access position.

This solution allows the machine according to the disclosure to reach a high productivity with small space occupation, so as to be able to arrange the machine according to the disclosure conveniently to the side of the printing machine, thus allowing an operator to manually intervene, from a single station, on both machines, with consequent advantages also for the ergonomics of the repeated movement that said operator will have to perform manually with his arms several times over time.

It should be noted that the opposite sides of the exposure chamber 3 arranged along the movement trajectory of the carriage 5 are conveniently provided with respective access openings 3*a*, which allow the entry and exit of the carriage 5 and of the objects arranged on the respective pans 6*a* and 6*b* with respect to the exposure chamber 3, and can be closed, during each cycles for drying the UV inks that occurs in the exposure chamber 3, by means of respective protective doors 10.

Conveniently, in order to keep the dimensions of the machine compact, the protective doors 10 are slidingly mounted on guides 11 and are actuated by automatic movement means.

Advantageously, the protective doors 10 are made of PMMA acrylic material, which is substantially transparent and of orange color, so as to reduce the glare of the UV radiation that otherwise would be unpleasant.

In this manner, the operator is capable of supervising the whole drying inside the exposure chamber 3 without being exposed to the UV radiation emitted by the emission source 4.

More particularly, the protective doors 10 may, for example, be made of the material commercially known as ALTUGLASS 100.1500, which is specific for use with UV light, since it allows to filter UV radiation.

It should be noted that the UV ray emission source 4 in the exposure chamber 3 is advantageously constituted by at least one ultraviolet LED lamp 12 which, besides allowing the possibility to dry substantially instantly solvent-free inks by exposure to UV rays, offer considerable advantages both from the energy standpoint, due to their reduced consumption, and from the environmental standpoint, since they are free from mercury or other dangerous substances and do not emit ozone.

In the exposure chamber, the lamp 12 is mounted on a slider 12*a* which can be actuated in motion by means of a first worm screw 13*a*, which extends along a direction that is substantially parallel to the axis of the pans 6*a* and 6*b* and allows its optimum adjustment in height in the region to be dried.

In particular, said height adjustment of the position of the lamp 12 is provided by means of a first knob 14*a*, arranged outside the exposure chamber 3, which acts on the first worm screw 13*a*.

Figure 6:
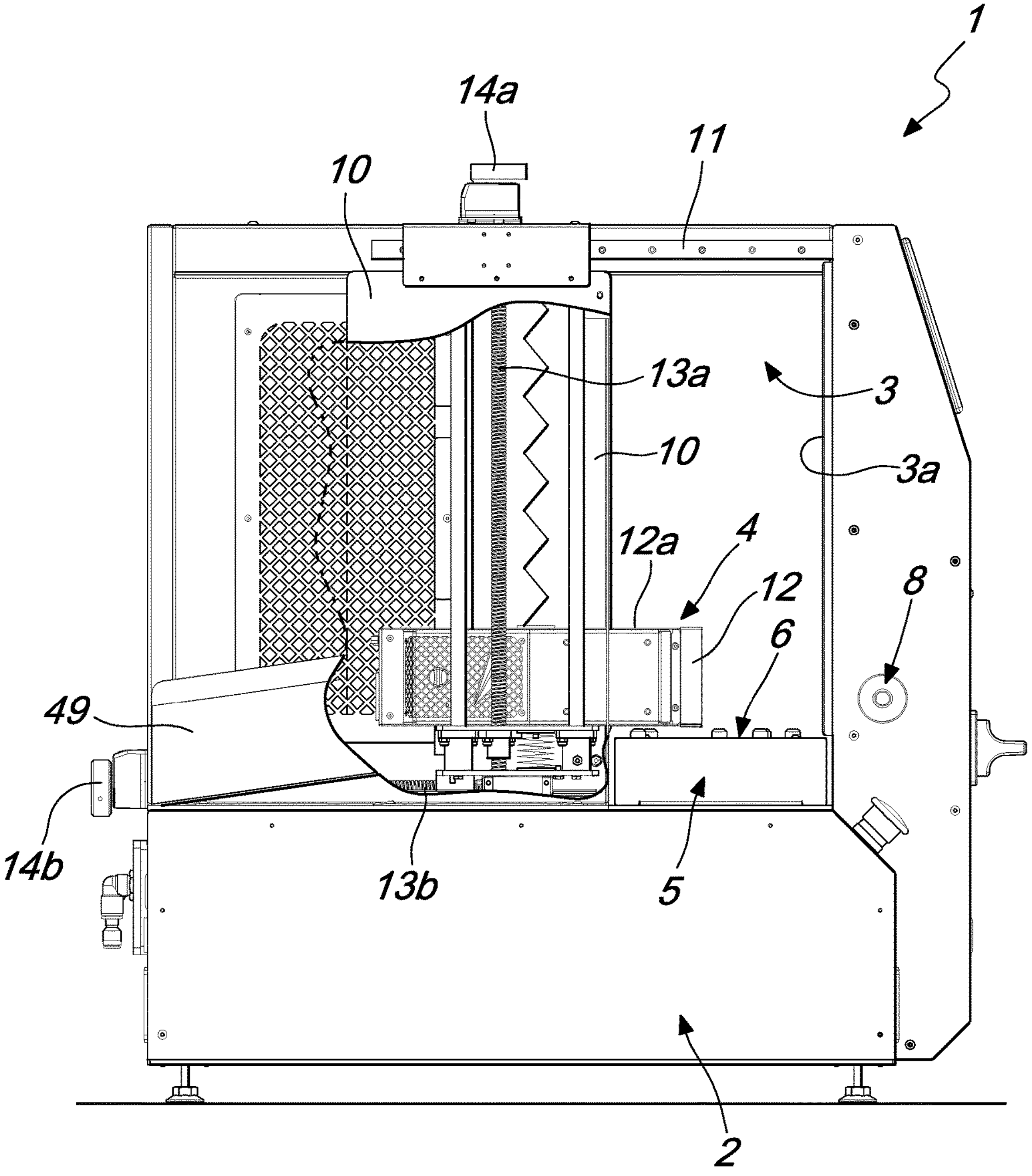
FIG. 6 is a partially cutaway lateral elevation view of the machine according to the disclosure.

As shown in FIG. 6, the position of the lamp 12 can be adjusted also along a direction that is substantially at right angles to the axis of the pans 6*a*, 6*b*, preferably by means of a second worm screw 13*b* which can be operated by means of a second knob 14*b*, also arranged outside the exposure chamber 3.

Advantageously, the centering and locking means comprise, for the pan 6 or each pan 6, at least one sucker element 15, for example made of silicone rubber, which is arranged axially with respect to the corresponding pan 6 and delimits a region which communicates with a suction duct 16 for connection to a vacuum source, not shown.

Conveniently, the centering and locking means of each pan 6 comprise moreover a plurality of claws 17 which protrude upward from the corresponding pan 6 and are designed to make contact with the object to be processed, which is arranged on the corresponding pan 6.

The claws 17 are movable on command toward or away from the axis of the corresponding pan 6 in order to pass from a disengagement position, in which they are spaced from the object to be processed, to a retention position, in which they are arranged in contact with the object to be processed, and vice versa.

More particularly, each one of the pans 6 comprises a respective pair of plates, conveniently of a substantially disc-like shape, which are mutually superimposed and respectively constituted by an upper plate 18*a* and a lower plate 18*b*.

The upper plate 18*a* has first sliding seats 19*a*, substantially shaped like a slot, which are each engaged by a respective claw 17 and extend, with a circular arc-like extension, in a direction that is substantially radial with respect to the axis of the corresponding pan 6.

In turn, the lower plate 18*b* has, for each one of the first sliding seats 19*a*, a respective second sliding seat 19*b* engaged by the same claw 17 that engages the corresponding first sliding seat 19*a* in the upper plate 18*a*.

The second sliding seats 19*b* extend in a substantially radial direction with respect to the axis of the corresponding pan 6 with a circular arc-like extension with the concavity directed oppositely with respect to the concavity of the corresponding first sliding seat 19*a*.

In this manner, the claws 17 are movable along the corresponding first sliding seat 19*a* following a rotation, in one direction or the other, of the first plate 18*a* with respect to the second plate 18*b*, about an axis that is substantially parallel to the axis of the corresponding pan 6.

In greater detail, the claws 17 can be constituted by respective knurled knobs 20, axially crossed by a threaded hole 20*a*, in which respective threaded pivots 21 are screwed which respectively engage the first and second sliding seats 19*a* and 19*b* of the corresponding claw 17 and have a respective wider head 21*a* designed to abut against the face of the lower plate 18*b* which is directed opposite with respect to the upper plate 18*a*.

In order to adjust the position of the claws 17 with respect to the axis of the corresponding pan 6 it is sufficient for the operator to loosen the claws 17, by unscrewing the corresponding knurled knob 20 from the respective threaded pivot 21, so as to unlock the possibility of relative rotation between the upper plate 18*a* and the lower plate 18*b*, about the axis of the corresponding pan 6, and then rotate the upper plate 18*a* with respect to the lower plate 18*b*, about the axis of the corresponding pan 6, so as to allow the threaded pivots 21 of the claws 17 to slide along the first and second sliding seats 19*a* and 19*b*.

Once the position of the claws 17 has been adjusted at the desired distance from the axis of the corresponding pan 6, it is sufficient for the operator to tighten the claws 17 by screwing the knurled knobs 20 along the threaded pivots 21 in order to block the claws 17 and the possibility of relative rotation between the upper plate and the lower plate 18*a* and 18*b*.

In this manner it is possible to adjust the centering of the objects to be processed that have the most widespread diameters without the aid of accessories.

Figure 7:
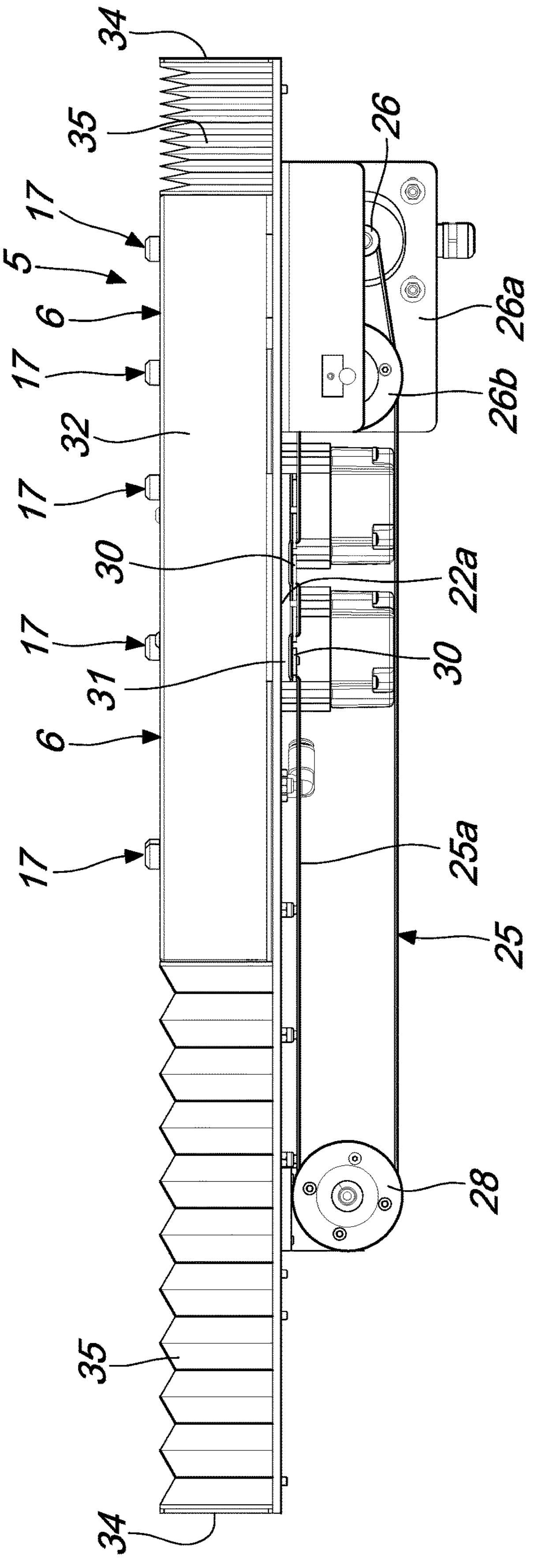
FIG. 7 is a lateral elevation view of a carriage of the machine according to the disclosure.
Figure 8:
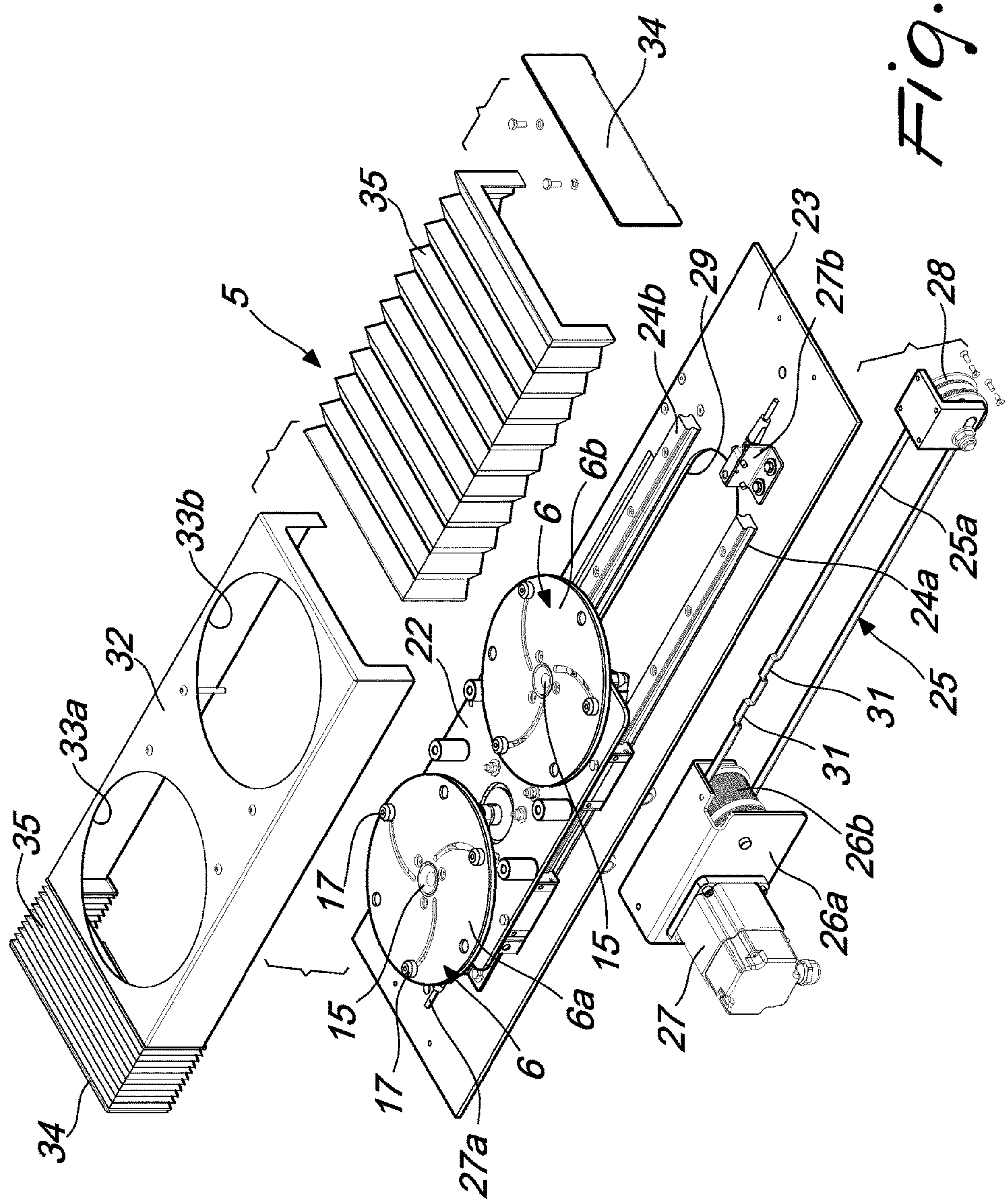
FIG. 8 is an exploded perspective view of the carriage of FIG. 5.
Figure 9:
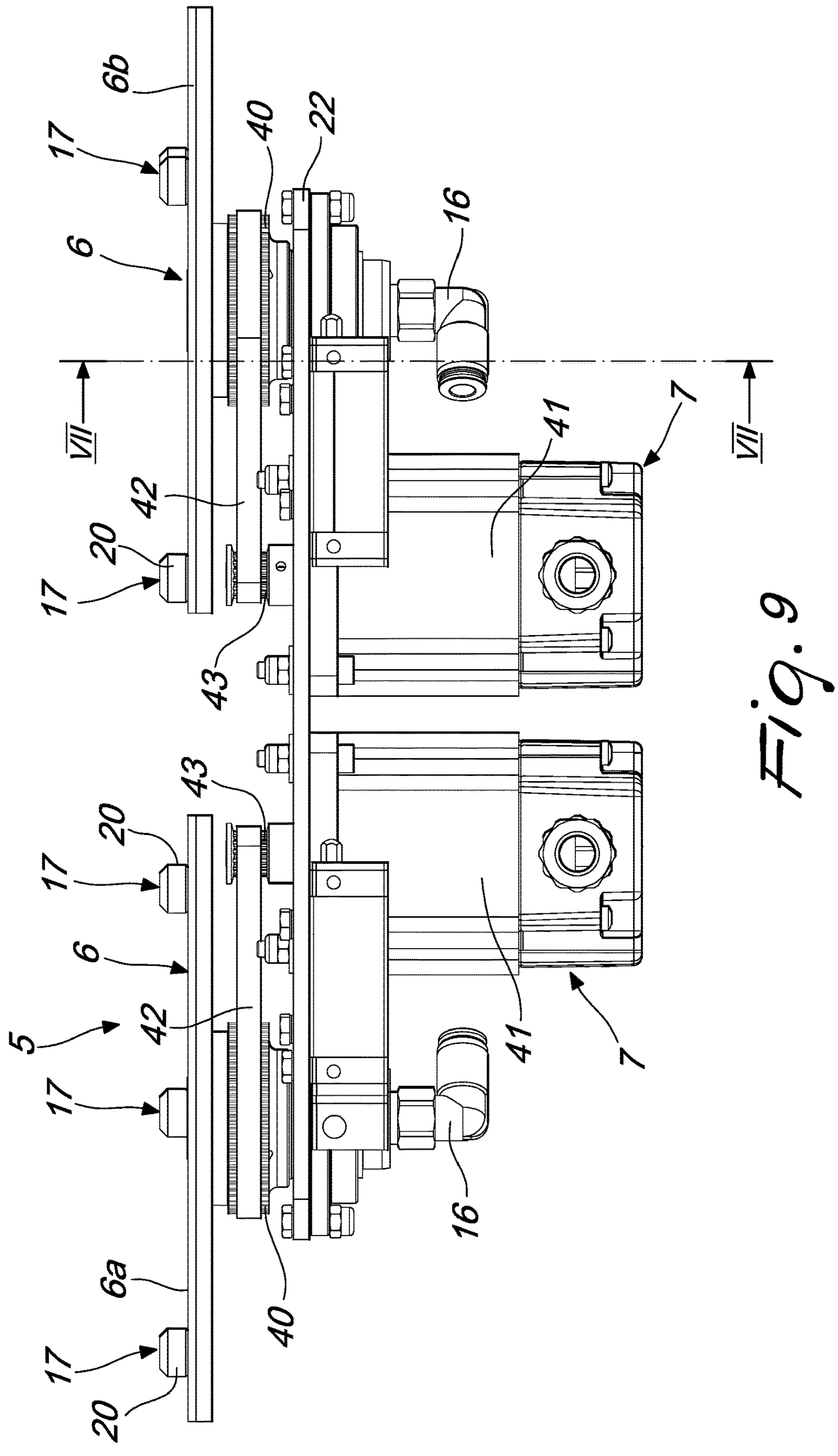
FIG. 9 is a lateral elevation view of a detail of the carriage of the machine according to the disclosure.

With reference, particularly, to FIGS. 7 and 8, the carriage 5 comprises a base body 22 mounted so it can slide along longitudinal guides 24*a*, 24*b* on a face that is directed upward of a supporting plate 23, which is fixed to the supporting frame 2.

Substantially at its opposite ends arranged along a direction that is substantially parallel to the longitudinal guides 24*a* and 24*b*, the base body 22 of the carriage 5 supports, so as to allow rotation about the corresponding axes, the first and the second pans 6*a* and 6*b*.

The actuation in motion of the base body 22 of the carriage 5 along the longitudinal guides 24*a* and 24*b* is provided by a closed-loop flexible motion transmission element 25, such as for example a belt or the like, which is extended between at least a motorized pulley 26, connected to a driving motor 27, and a driven pulley 28, so as to define at least one active portion 25*a* for moving the base body 22 of the carriage 5, which is fixed to said base body.

Conveniently, the motorized pulley 26 is supported, with the corresponding movement motor 27, by a housing 26*a*, which is fixed to the supporting plate 23, on which an auxiliary guiding pulley 26*b* also can be optionally mounted so that it can rotate and has a diameter that substantially corresponds to that of the driven pulley 28, engages the motion transmission element 25 and is arranged so that the corresponding axis is substantially parallel and spaced from the axis of the driving pulley 26.

In particular, the flexible motion transmission element 25 extends below the supporting plate 23 and conveniently the actuation unit 26 and the guiding pulley 28 are supported by the face of the supporting plate 23 that is directed downward.

More particularly, the base body 22 is connected to the active portion 25*a* of the flexible motion transmission element 25 with a connecting portion 22*a* thereof, which passes through a through slot 29, formed in the supporting plate 23, between the longitudinal guides 24*a* and 24*b*, for example by means of connection elements 30, which form, on the active portion 25*a* of the flexible motion transmission element 25, folds or bends 30 at its points for fixing to the base body 22.

It should be noted that conveniently on the supporting plate 23 it is possible to fix, at the opposite ends of the longitudinal guides 24*a* and 24*b*, stroke limit sensors 27*a*, 27*b*, functionally connected to the movement motor 27, which are designed to detect the reaching, by the base body 22, of the corresponding positions that correspond to the stroke limit positions 9*a* and 9*b* of the carriage 5 and to send a corresponding signal to the movement motor 27 to command its halting and the reversal of the direction of the rotation after a preset time.

A covering casing 32 can be conveniently fixed above the base body 22 of the carriage 5 and is provided with circular openings 33*a* and 33*b* through which the first and the second pans 6*a* and 6*b* are respectively accessible from outside.

Two lateral closure walls 34 are fixed at the ends of the supporting plate 23 arranged along a direction that is substantially parallel to the direction of extension of the longitudinal guides 24*a* and 24*b*, and are substantially at right angles to the face directed upward of the supporting plate 23.

Bellows-like covering elements 35 can be interposed between the covering casing 32 and the lateral closure walls 34.

Figure 10:
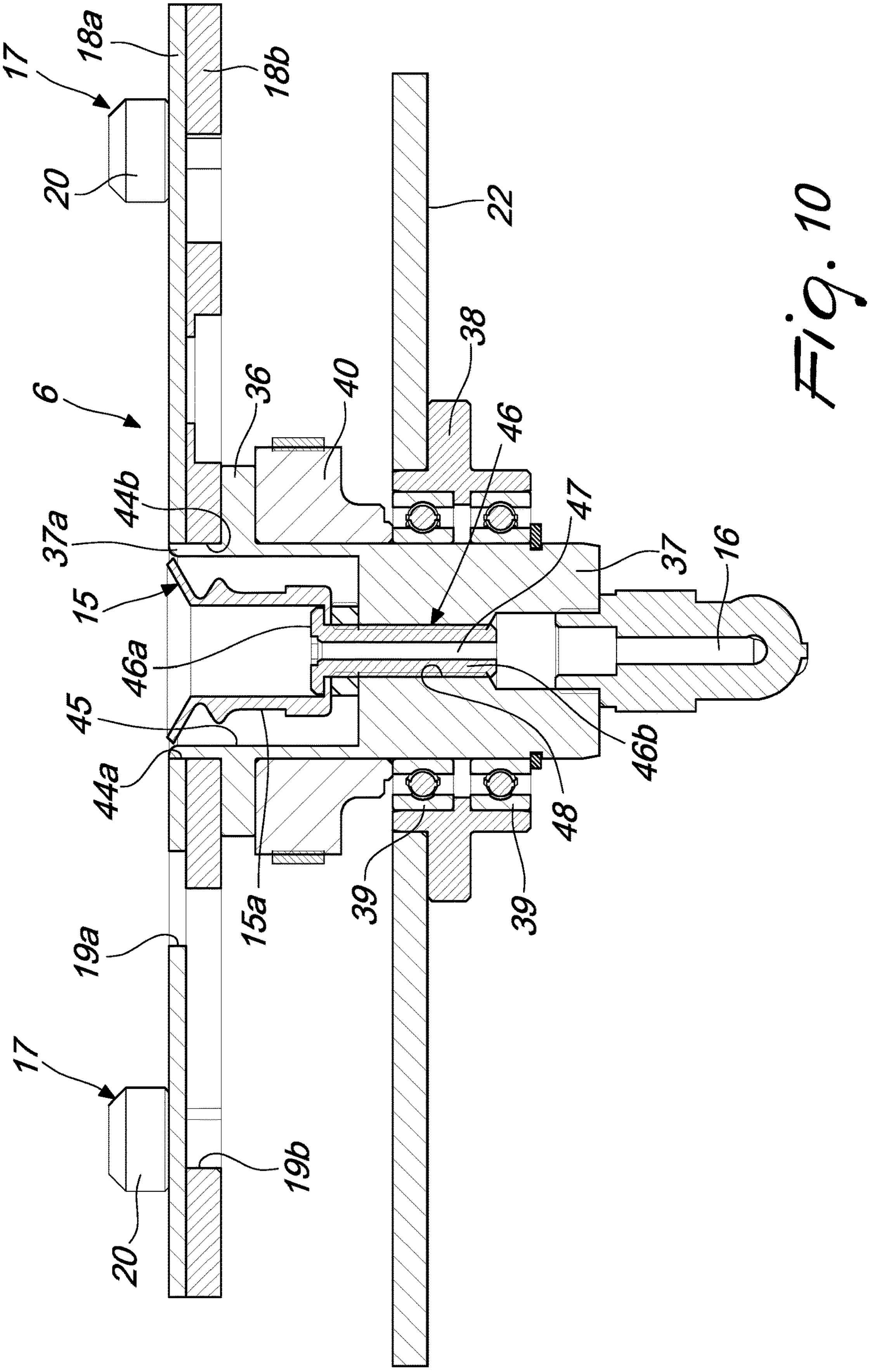
FIG. 10 is a sectional view taken along the plane VII-VII of FIG. 7.
Figure 11:
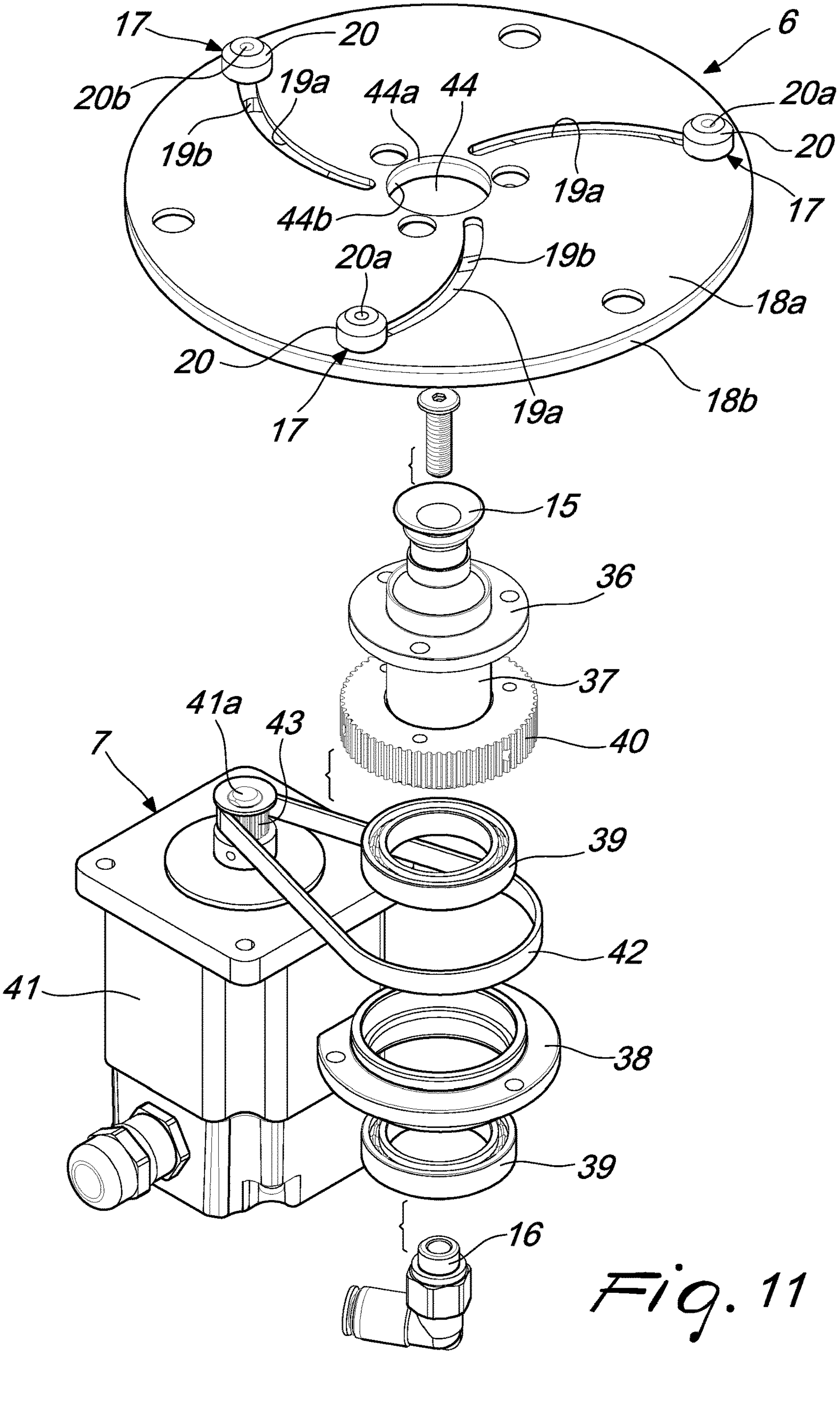
FIG. 11 is an exploded perspective view of a pan for supporting the printed objects of the machine according to the disclosure.
Figure 12:
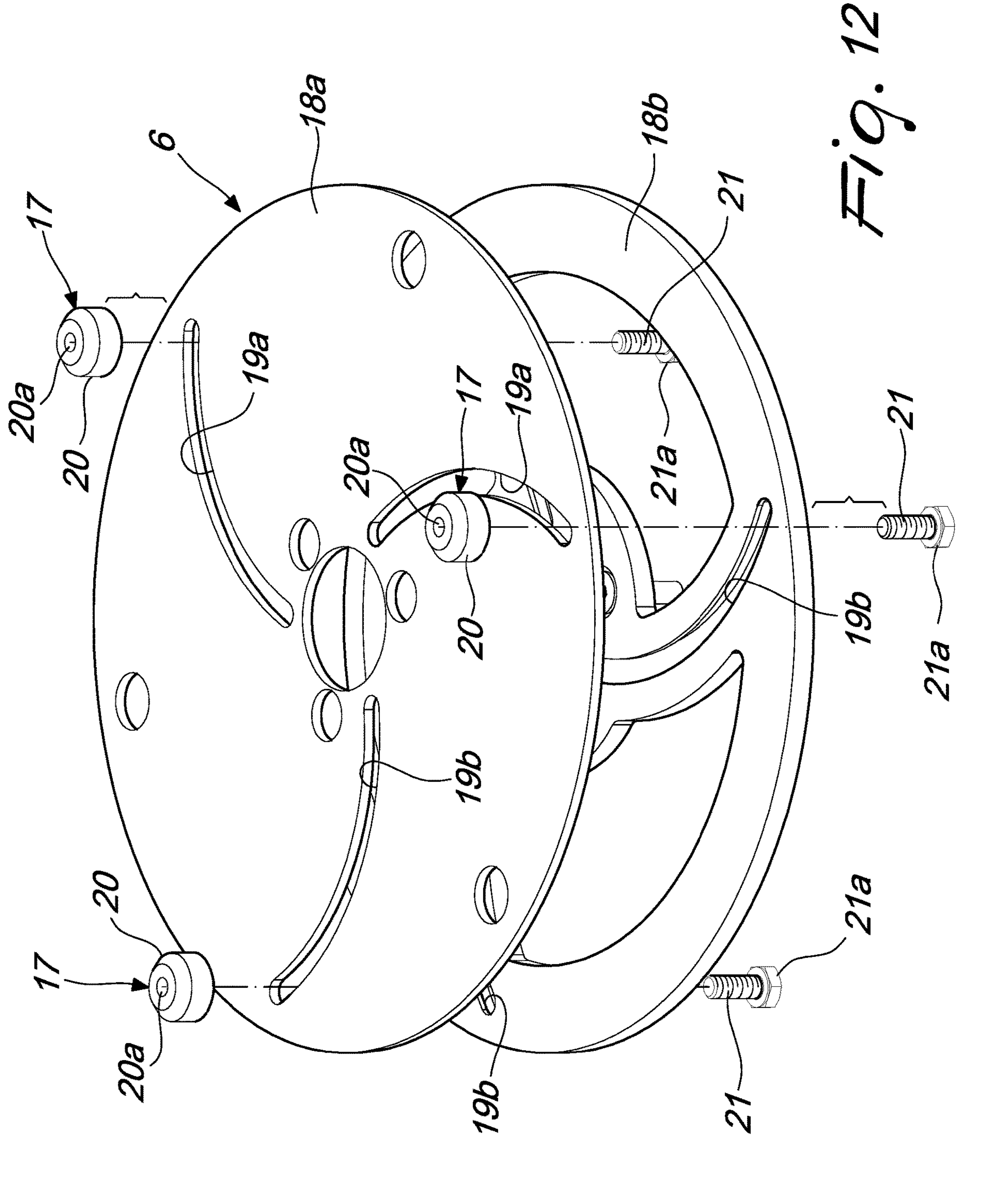
FIG. 12 is an exploded perspective view of a portion of the pan.

As shown in particular in FIGS. 10 and 11, each pan 6*a* and 6*b* is axially fixed, for example by means of a flange 36, to an axial end 37*a* of a respective hollow shaft 37 which, in turn, is conveniently mounted so that it can rotate in a bushing 38, which is fixed to the base body 22, advantageously by means of the interposition of a pair of bearings 39.

The rotational actuation, with respect to the base body 22, of the hollow shaft 37 about its axis and therefore of the corresponding pan 6*a*, 6*b* about the corresponding axis is, for example, provided by means of a first gear 40, which is keyed on the hollow shaft 36 and is functionally connected to an actuation motor 41 conveniently by means of a belt drive element 42 that is extended between the first gear 40 and a second gear 43, which in turn is keyed on the output shaft 41*a* of the actuation motor 41.

Preferably, the actuation motors 41 of both pans 6*a* and 6*b* are of the step type and are controlled by a respective control unit managed by a suitable software.

This solution offers the possibility of precise control of the rotation of the pans 6*a*, 6*b*, so as to allow the possibility to introduce in the exposure chamber 3 even objects to be processed that have protrusions.

Advantageously, the hollow shaft 37 passes through a central hole 44 which is formed in the corresponding pan 6 and in practice is provided by two axial holes 44*a* and 44*b* which are mutually aligned and are formed respectively in the upper plate 18*a* and in the lower plate of the pan 6*a* and 6*b*, so that its axial end 37*a* is directed outward.

More particularly, a recess 45 is formed axially in the hollow shaft 37, is open at the axial end 37*a* of the hollow shaft 37 and accommodates the sucker element 15, while the suction duct 16 is connected to the other axial end 37*b* of the hollow shaft 37 and is in communication with the sucker element 15.

Preferably, as shown particularly in FIG. 10, the sucker element 15 is provided by a bellows-type sucker 15*a*, which is provided peripherally with two folds which allow its compression in an axial direction.

In particular, with this structure, when the sucker 15*a*, as a result of the vacuum created inside it via the suction duct 16, grips the object to be processed which is arranged on the corresponding pan 6*a*, 6*b*, by virtue of its particular structure, it compresses, in this way retaining the object to be processed toward the pan 6*a*, 6*b* and thus ensuring a stable grip for the entire drying cycle.

In order to obtain this effect in the best way depending on the object to be processed, the sucker 15*a* is assembled to the hollow shaft 37 by means of a screw 46 which is crossed axially by a passage 47, which allows to connect the internal cavity of the sucker 15*a* to the vacuum source, through the suction duct 16.

In particular, the head 46*a* of the screw 46 rests against the bottom of the internal cavity of the sucker 15*a*, while its threaded stem 46*b* is screwed into an axial female thread 48 formed in the hollow shaft 37, so that by screwing or unscrewing the screw 46 with respect to the female thread 48 it is possible to provide the height adjustment of the sucker 15*a*.

It should be noted that the degree of vacuum obtained in the sucker 15*a* and therefore its grip strength can be adjusted conveniently by a not shown pressure regulator interposed along the suction duct 16.

With reference again to the preferred embodiment shown in the figures, substantially at each one of the stroke limit positions 9*a* and 9*b* of the carriage there are advantageously corresponding automatic unloading means 8.

In particular, the automatic unloading means 8 arranged at the first stroke limit position 9*a* are adapted to act on the processed objects arranged on the first pan 6*a*, when the carriage 5 reaches the first stroke limit position 9*a*, while the automatic unloading means 8 arranged at the second stroke limit position 9*b* are adapted to act on the processed objects arranged on the second pan 6*b*, when the carriage 5 reaches the second stroke limit position 9*b*.

More particularly, the automatic unloading means 8 comprise pusher means capable of producing, on the processed object arranged on the corresponding pan 6*a*, 6*b*, a thrust in the direction of a respective unloading chute 49 which is provided on the supporting frame 2 and extending, conveniently, laterally to the region affected by the movement of the carriage 5 and on the opposite site with respect to the corresponding pusher means, along a direction substantially at right angles to the trajectory of movement of the carriage 5, in order to allow the conveyance by gravity of the processed objects, expelled by the respective pusher means from the corresponding pan 6*a* and 6*b*, into an adapted collection tank, not shown.

In greater detail, the pusher means are advantageously each provided by a device for the emission of at least one jet of compressed air directed toward the corresponding pan 6*a*, 6*b*.

Conveniently, each emission device includes at least one respective nozzle 50, which can be provided by a tubular element, supported by the supporting frame 2, which extends substantially parallel and laterally to the trajectory of movement of the carriage 5 and has on its own lateral surface at least one outlet for the compressed air.

The advantage of the use of a device for the emission of a jet of air in order to provide the pusher means, instead of mechanical elements, is to provide the unloading of the processed objects from the pans 6*a* and 6*b* at a higher speed, with consequent higher productivity, and with a reduction of space occupation.

Conveniently, each nozzle 50 provides for suitable adjustments for optimizing the unloading depending on the objects to be processed.

A first possible adjustment of each one of the nozzles 50 is of the mechanical type and is provided by rotation of said nozzle about its own axis, in order to direct the jet of air in the best way, especially in presence of objects of small size; the second adjustment of each nozzle 50 can be performed by a pressure adjustment device arranged in the pneumatic supply circuit of said nozzle, which allows to adjust the pushing force of the emitted air jet; the third adjustment that can be performed on each one of the nozzles 50 includes the possibility to vary the duration in seconds of the jet of air emitted by said nozzles.

By means of these adjustments it is possible to unload from the pans 6*a* and 6*b* any object in a controlled manner, preventing the objects from being both accidentally retained on the machine and propelled to the ground by falling outside the chutes 49 or, in any case, the collecting tank.

Advantageously, on the supporting frame 2 there is a data setting and control panel 51, which is connected functionally to an electronic control and command unit of the machine, which allows the operator to set various operating parameters of the machine.

In particular, in the common case in which the objects to be processed have a cylindrical shape, the operator may, for example, set on the panel 51 the cycle of rotation of the pans 6*a*, 6*b*, i.e., the parameters related to the number of revolutions of each pan 6*a* and 6*b* and to the rotation rate with which these revolutions must be performed by each pan 6*a* and 6*b*.

Experimental tests have allowed to determine the combination between number of revolutions of the pans 6*a* and 6*b*, rotation rate of said pans and intensity of the UV radiation emitted by the emission source 4 that allows to provide the perfect drying of the UV inks applied to the printed surface of the objects to be processed.

In the case of objects with protrusions, such as for example a cup with a handle, the possible small distance between the lamps 12 and the object would instead risk causing a collision between the rotating object on the corresponding pan 6*a*, 6*b* and the lamp 12, preventing the possibility to rotate the object through 360°.

In this case, by virtue of the panel 51 the operator can set a cycle with alternate rotation of the pans 6*a*, 6*b*, i.e., setting, for the pans 6*a* and 6*b*, a partial rotation expressed in degrees, actuated in one direction and in the other, so as to be able to dry the printed region of the objects without them colliding against the lamp 12.

The operation of the machine, according to the disclosure, is as follows.

Once the appropriate settings of the machine have been performed by means of the panel 51, with the carriage in the first stroke limit position 9*a*, the operator arranges on the first pan 6*a* an object to be processed on which printing with UV inks has been applied in a printing machine.

At this point, the operator activates the means for centering and locking the object to be processed on the first pan 6*a*.

In particular, in order to do this, the operator loosens the claws 17 of the first pan 6*a*, by unscrewing the knurled knobs 20 from the threaded pivots 21, and rotates the upper plate 18*a* of the first pan 6*a* with respect to the lower plate 18*b*, so as to make the claws 17 slide along the first sliding seats 19*a* until they are arranged in contact with the object to be processed.

At this point the operator tightens the claws 17 by screwing the knurled knobs 20 on the threaded pivots 21 so as to lock the claws 17 in the position of contact with the object to be processed.

The operator then operates the vacuum source so as to cause the activation of the sucker element 15 of the first pan 6*a*, thus obtaining a suitable retention of the object to be processed on the first pan 6*a*.

At this point, after opening the protective doors 10 of the exposure chamber 3, the carriage 5 is actuated, so as to bring it from the first stroke limit position 9*a* to the second stroke limit position 9*b*, with consequent movement of the first pan 6*a* with the corresponding object to be processed in the exposure chamber 3 and simultaneous movement of the second pan 6*b* in the corresponding access position.

At this point the protective doors 10 of the exposure chamber 3 are closed.

While it is in the exposure chamber 3, the first pan 6*a* is rotated about its own axis, so as to produce the rotation of the object to be processed that is arranged thereon, and at the same time the lamp 12 is activated, so that the object to be processed can receive the UV radiation on its lateral surface with consequent drying of the UV inks.

Also while the first pan 6*a* is in the exposure chamber 3, the operator positions on the second pan 6*b* another object to be processed and, in a manner similar to what he did on the first pan 6*a*, performs the centering and locking on the second pan 6*b* of the corresponding object to be processed.

Once the drying cycle of the object arranged on the first pan 6*a* has ended, the protective doors 10 of the exposure chamber 3 are opened and the carriage 5 is moved again into the first stroke limit position 9*a*, so as to bring the first pan 6*a*, with the processed object arranged thereon, into the corresponding access position, and the second pan 6*b*, with the corresponding object to be processed, into the exposure chamber 3.

At this point the protective doors 10 are closed again.

While it is in the exposure chamber 3, the second pan 6*b* is rotated about its own axis, so that the corresponding object to be processed is also rotated, and at the same time the lamp 12 is activated, so as to perform the drying cycle also on the object to be processed that is arranged on the second pan 6*b*.

In the meantime, the means for the automatic unloading of the processed object arranged on the first pan 6*a* are activated.

In particular, when the carriage 5 reaches the first stroke limit position 9*a* and therefore the first pan 6*a* reaches the corresponding access position, after exiting from the exposure chamber 3, the connection between the vacuum source and the sucker element 15 of the first pan 6*a* is interrupted, so that the processed object is no longer retained by the sucker element 15.

The nozzle 50 that corresponds to the first stroke limit position 9*a* of the carriage 5 is then fed so as to strike the processed object arranged on the first pan 6*a* with a jet of compressed air which causes it to fall toward the corresponding chute 49 from which it reaches the collecting tank.

At this point, the first pan 6*a* is again ready to receive from the operator a new object to be processed, which is centered and locked on the first pan 6*a* by virtue of the corresponding centering and locking means, similarly to what has been described before.

Once the drying cycle of the object to be processed arranged on the second pan 6*b* has ended, the protective doors 10 are opened and the carriage 5 is actuated again in order to move it into the second stroke limit position 9*b*, so as to bring the second pan 6*b*, with the processed object positioned thereon, into the corresponding access position and the first pan 6*a*, with the new object to be processed positioned thereon, into the exposure position.

While a new drying cycle of the object to be processed arranged on the first pan 6*a* occurs, the processed object arranged on the second pan 6*b* is unloaded by the corresponding automatic unloading means, by means of the activation of the nozzle 50 arranged at the second stroke limit position 9*b*, so as to free again the second pan 6*b* and thus make it ready again to receive from the operator a further object to be processed.

At this point, the operation of the machine may continue as described above.

In practice it has been found that the disclosure achieves the intended aim and objects, a machine for drying inks of the UV type having been provided which is compact and has a high performance.

A particular advantage of the machine according to the disclosure resides in that, by virtue of the centering and locking means provided on the pans with the sucker element arranged axially, it is possible to obtain a correct and safe grip of the objects to be processed on the pans, without the need for accessories for format change.

It should be noted, moreover, that the possibility to adjust the position of the lamp 12 in the most correct position allows an efficient and fast drying of the inks.

It should be noted that the use of sliding and transparent doors of the drying chamber allows a view of the object being dried while keeping the machine safe, according to current regulations, without having to resort to bulky tunnels or protections in order to keep the UV radiation inside the exposure chamber.

Another aspect to be pointed out is that by virtue of its small dimensions, the machine according to the disclosure is easy to position to the side of the printing machines, thus allowing the operator to work ergonomically both on the printing machine and on the machine according to the disclosure from the same station.

It is also noted that the fact of providing two pans on the carriage allows the machine to reach high production levels, reaching up to 900/1000 pieces/hour.

It is also possible to provide the possibility for the user to choose the use of only one of the two pans, particularly the one that is easier to reach for its position, leaving the other locked in rotation and unused.

The use of the machine according to the disclosure in the sector of screen printing allows to avoid the use of solvent-based inks, which are harmful to the health and the environment.

It should also be added that the use in the machine according to the disclosure of lamps with UV-LED technology allows furthermore to avoid the drawbacks of traditional UV lamps, such as high consumption and maintenance, presence of harmful substances such as mercury, generation of unwanted heat and ozone.

By virtue of the machine according to the disclosure, the production process as a whole benefits from considerable advantages, also in terms of time, since it is possible to print and dry immediately the objects to be processed without long waiting times.

The disclosure thus conceived is susceptible of numerous modifications and variations, all of which are within the scope of the accompanying claims; all the details may furthermore be replaced with other technically equivalent elements.

In practice, the materials used, so long as they are compatible with the specific use, as well as the contingent shapes and dimensions, may be any according to the requirements and the state of the art.

The disclosures in Italian Patent Application No. 102019000018977, from which this application claims priority, are incorporated by reference.

The invention claimed is:

1. A machine for drying inks of the UV type, the machine comprising: a supporting frame, which forms at least one exposure chamber, configured to be accessed from the outside and accommodates at least one UV ray emission source, further comprising, on said supporting frame, at least one carriage which supports rotatably at least one supporting pan for supporting at least one object to be processed which is provided, on a surface thereof, with at least one print provided by UV inks, means for rotational actuation of said at least one supporting pan about an axis thereof being provided to rotate said at least one object to be processed, said carriage being movable with respect to said supporting frame to move said at least one supporting pan from an exposure position, in which said at least one supporting pan is arranged within said exposure chamber, to subject the UV inks applied to the object to be processed to an action of the UV rays emitted by said at least one emission source, to at least one respective access position, in which said at least one supporting pan is arranged outside of said exposure chamber, to allow a loading of said at least one object to be processed on said at least one supporting pan or an unloading of the processed object from said at least one supporting pan, said rotational actuation means being activatable on command at least with said at least one supporting pan in said exposure position, wherein said carriage rotatably supports at least two supporting pans, respectively at least one first supporting pan and at least one second supporting pan, each configured to receive at least one respective object, said carriage being movable with respect to said supporting frame, so that alternately one of said first and second supporting pans is in said exposure position and simultaneously another of said first and second supporting pans is in a corresponding access position, wherein said carriage is configured to move by translation, with an alternating back and forth motion, along a movement trajectory, between at least two stroke limit positions, respectively a first stroke limit position and a second stroke limit position, arranged at opposite ends of said movement trajectory, said at least one exposure chamber being formed in an intermediate region along said movement trajectory, said supporting pans being arranged to be mutually aligned along a direction that is substantially parallel to said movement trajectory, said first supporting pan being in the corresponding access position and said second supporting pan being in said exposure position, with said carriage in said first stroke limit position, said first supporting pan being arranged in said exposure position and said second supporting pan being in the corresponding access position with said carriage in said second stroke limit position.

2. The machine according to claim 1, wherein said at least one supporting pan comprises means for centering and locking of said at least one object to be processed with respect to said at least one supporting pan.

3. The machine according to claim 1, further comprising means for an automatic unloading of the processed object from said at least one supporting pan, configured to be activated on command with said at least one supporting pan in said access position.

4. The machine according to claim 2, wherein said centering and locking means comprise at least one sucker element which is arranged axially with respect to a corresponding supporting pan and delimits a region which communicates with a suction duct for connection to a vacuum source.

5. The machine according to claim 2, wherein said centering and locking means comprise a plurality of claws which protrude upward from the corresponding supporting pan and are configured to make contact with the object to be processed, which is arranged above the corresponding supporting pan, said claws being movable on command toward or away from the axis of the corresponding supporting pan to pass from a disengagement position, in which they are spaced from the object to be processed, to a retention position, in which they are arranged in contact with the object to be processed, and vice versa.

6. The machine according to claim 1, wherein each one of said supporting pans comprises a respective pair of plates which are mutually superimposed, respectively an upper plate and a lower plate, said upper plate having first sliding seats, each engaged by a respective claw and extending, along a circular arc-like extension, in a direction that is substantially radial with respect to the axis of the corresponding supporting pan, said lower plate having, for each one of said first sliding seats, a respective second sliding seat engaged by a same claw that engages a corresponding first sliding seat, said second sliding seats extending in a substantially radial direction with respect to the axis of the corresponding supporting pan along a circular arc-like extension with a concavity directed oppositely with respect to a concavity of the corresponding first sliding seat, said claws being movable along the corresponding first sliding seat following a rotation, in one direction or another, of said upper plate with respect to said lower plate.

7. The machine according to claim 1, further comprising, substantially at each one of said stroke limit positions of said carriage, respective automatic unloading means, the automatic unloading means arranged at said first stroke limit position being adapted to act on the processed objects arranged on said first supporting pan, when said carriage reaches said first stroke limit position, the automatic unloading means arranged at said second stroke limit position being adapted to act on the processed objects arranged on said second supporting pan, when said carriage reaches said second stroke limit position.

8. The machine according to claim 3, wherein said automatic unloading means comprise pusher means adapted to produce, on the processed object arranged on the corresponding supporting pan, a thrust in the direction of a respective unloading chute formed on said supporting frame.

9. The machine according to claim 8, wherein said pusher means comprise a device for an emission of at least one jet of air directed toward the corresponding supporting pan.

10. A method for drying inks of the UV type, the method including the following steps:

positioning an object to be processed, which bears inks of the UV type to be dried printed thereon, on a pan rotatably supported by a carriage and arranged in an access position, moving said carriage to bring said supporting pan to an exposure position, in which said supporting pan is arranged inside an exposure chamber, rotating said supporting pan, activating a UV radiation emission source accommodated in said exposure chamber to expose the inks of the UV type to be dried to UV rays emitted by said emission source, and moving said carriage to bring said pan from said exposure position to said access position:

unloading said processed object from said at least one supporting pan by means for an automatic unloading of the processed object from said at least one supporting pan, configured to be activated on command with said at least one supporting pan in said access position, wherein said automatic unloading means comprise pusher means adapted to produce, on the processed object arranged on the corresponding supporting pan, a thrust in the direction of a respective unloading chute.

11. The method according to claim 10, wherein the movement of said carriage to move said supporting pan from said exposure position to said access position is performed in a direction that is opposite with respect to a direction of the movement of said carriage to move said pane from said access position to said exposure position.

12. The method according to claim 10, wherein it provides, simultaneously with the exposure to UV rays of the UV inks to be dried applied to the object to be processed arranged on said supporting pan, access to another a second supporting pan arranged in a corresponding access position.

13. The method according to claim 12, further including the following steps:

while moving said carriage to move said first supporting pan from the corresponding access position to said exposure position, simultaneously moving said-a second supporting pan rotatably mounted on said carriage from the exposure position to a corresponding access position, rotating said first supporting pan and activating said emission source, to perform a step of drying the UV inks applied to the object to be processed which is arranged on said first supporting pan, arranging, simultaneously with the execution of the drying step of the UV inks applied to the object to be processed that is arranged on said first supporting pan, another object to be processed on said second supporting pan, moving said carriage to move said second supporting pan from the corresponding access position to said exposure position, simultaneously moving said first supporting pan from said exposure position to the corresponding access position, rotating said second supporting pan and activating said emission source, to perform a step of drying the UV inks applied to the object to be processed which is arranged on said second supporting pan, performing, simultaneously with the step of drying the UV inks applied to the object to be processed that is arranged on said second supporting pan, the unloading of the processed object from said first supporting pan, and arranging on said first supporting pan a new object to be treated and repeating the cycle.

14. A machine for drying inks of the UV type, the machine comprising: a supporting frame, which forms at least one exposure chamber, configured to be accessed from the outside and accommodates at least one UV ray emission source, further comprising, on said supporting frame, at least one carriage which supports rotatably at least one supporting pan for supporting at least one object to be processed which is provided, on a surface thereof, with at least one print provided by UV inks, means for rotational actuation of said at least one supporting pan about an axis thereof being provided to rotate said at least one object to be processed, said carriage being movable with respect to said supporting frame to move said at least one supporting pan from an exposure position, in which said at least one supporting pan is arranged within said exposure chamber, to subject the UV inks applied to the object to be processed to an action of the UV rays emitted by said at least one emission source, to at least one respective access position, in which said at least one supporting pan is arranged outside of said exposure chamber, to allow a loading of said at least one object to be processed on said at least one supporting pan or an unloading of the processed object from said at least one supporting pan, said rotational actuation means being activatable on command at least with said at least one supporting pan in said exposure position, and further comprising means for an automatic unloading of the processed object from said at least one supporting pan, configured to be activated on command with said at least one supporting pan in said access position, wherein said automatic unloading means comprise pusher means adapted to produce, on the processed object arranged on the corresponding supporting pan, a thrust in the direction of a respective unloading chute formed on said supporting frame.

15. A machine for drying inks of the UV type, the machine comprising: a supporting frame, which forms at least one exposure chamber, configured to be accessed from the outside and accommodates at least one UV ray emission source, further comprising, on said supporting frame, at least one carriage which supports rotatably at least one supporting pan for supporting at least one object to be processed which is provided, on a surface thereof, with at least one print provided by UV inks, means for rotational actuation of said at least one supporting pan about an axis thereof being provided to rotate said at least one object to be processed, said carriage being movable with respect to said supporting frame to move said at least one supporting pan from an exposure position, in which said at least one supporting pan is arranged within said exposure chamber, to subject the UV inks applied to the object to be processed to an action of the UV rays emitted by said at least one emission source, to at least one respective access position, in which said at least one supporting pan is arranged outside of said exposure chamber, to allow a loading of said at least one object to be processed on said at least one supporting pan or an unloading of the processed object from said at least one supporting pan, said rotational actuation means being activatable on command at least with said at least one supporting pan in said exposure position, wherein said carriage rotatably supports at least two supporting pans, respectively at least one first supporting pan and at least one second supporting pan, each configured to receive at least one respective object, said carriage being movable with respect to said supporting frame, so that alternately one of said first and second supporting pans is in said exposure position and simultaneously another of said first and second supporting pans is in a corresponding access position, wherein each one of said supporting pans comprises a respective pair of plates which are mutually superimposed, respectively an upper plate and a lower plate, said upper plate having first sliding seats, each engaged by a respective claw and extending, along a circular arc-like extension, in a direction that is substantially radial with respect to the axis of the corresponding supporting pan, said lower plate having, for each one of said first sliding seats, a respective second sliding seat engaged by a same claw that engages a corresponding first sliding seat, said second sliding seats extending in a substantially radial direction with respect to the axis of the corresponding supporting pan along a circular arc-like extension with a concavity directed oppositely with respect to a concavity of the corresponding first sliding seat, said claws being movable along the corresponding first sliding seat following a rotation, in one direction or another, of said upper plate with respect to said lower plate.

* * * * *